US008164558B2

(12) United States Patent
Kim

(10) Patent No.: US 8,164,558 B2
(45) Date of Patent: Apr. 24, 2012

(54) DRIVING METHOD FOR DRIVER INTEGRATED CIRCUIT

(75) Inventor: Hyungkyu Kim, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 968 days.

(21) Appl. No.: 12/125,978

(22) Filed: May 23, 2008

(65) Prior Publication Data

US 2009/0085907 A1 Apr. 2, 2009

(30) Foreign Application Priority Data

Sep. 27, 2007 (CN) .......................... 2007 1 0175202

(51) Int. Cl.
*G09G 3/36* (2006.01)
*G09G 5/00* (2006.01)
*G06F 3/038* (2006.01)

(52) U.S. Cl. ............................. 345/96; 345/87; 345/209

(58) Field of Classification Search ............ 345/87–104, 345/204–215, 690–699
See application file for complete search history.

(56) References Cited

U.S. PATENT DOCUMENTS

| | | | | |
|---|---|---|---|---|
| 4,836,656 | A * | 6/1989 | Mouri et al. | 345/96 |
| 6,664,941 | B2 * | 12/2003 | Itakura et al. | 345/89 |
| 7,119,770 | B2 * | 10/2006 | Moon | 345/79 |
| 2002/0080107 | A1 * | 6/2002 | Fujimoto et al. | 345/87 |
| 2002/0180685 | A1 * | 12/2002 | Itakura et al. | 345/100 |
| 2007/0046610 | A1 * | 3/2007 | Okuzono | 345/96 |

* cited by examiner

*Primary Examiner* — Alexander Eisen
*Assistant Examiner* — Patrick F Marinelli
(74) *Attorney, Agent, or Firm* — Ladas & Parry LLP

(57) ABSTRACT

The present invention relates to a driving method for a driver IC, comprising: detecting a polarity of a gate line being driven; when the polarity changes, the driver integrated circuit drives the gate line with a first mode signal; when the polarity does not change, the driver integrated circuit drives the gate line with a second mode signal, a driving current of the first mode signal is greater than that of the second mode signal. In the present invention, the driver IC drives a gate line in different driving modes according to a condition that a polarity of the droved gate line changes. Since a driving current of the first mode signal is greater than that of the second mode signal, the present invention is enabled to minimize a difference between charging delays of pixel electrodes on gate lines, improving a dim line phenomenon.

11 Claims, 3 Drawing Sheets n-th frame

| | | | | | | | |
|---|---|---|---|---|---|---|---|
| G1 | + | - | + | - | + | - | + |
| G2 | + | - | + | - | + | - | + |
| G3 | - | + | - | + | - | + | - |
| G4 | - | + | - | + | - | + | - |
| G5 | + | - | + | - | + | - | + |

(n+1)-th frame

| | | | | | | | |
|---|---|---|---|---|---|---|---|
| G1 | - | + | - | + | - | + | - |
| G2 | - | + | - | + | - | + | - |
| G3 | + | - | + | - | + | - | + |
| G4 | + | - | + | - | + | - | + |
| G5 | - | + | - | + | - | + | - |

DRIVING METHOD FOR DRIVER INTEGRATED CIRCUIT

TECHNICAL FIELD

This invention relates to a driving method for a liquid crystal displayer, and particularly to a driving method for a driver integrated circuit.

BACKGROUND OF THE INVENTION

Currently, thin film transistor liquid crystal displayers (TFT-LCD) are gaining higher occupancy in the market of flat panel displayers. The TFT-LCDs are developing to have large size, multiple color numbers and high resolution.

A Driver integrated circuit (Driver IC) in the existing TFT-LCD only provides same output modes regardless reversion of polarity. Since delay degree of waveforms output by the driver integrated circuit under the same polarity is different from that of waveforms output by the driver integrated circuits after the polarity is inverted, a dim line phenomenon would occur. FIG. 5*a*, FIG. 5*b* are schematic diagram of a prior art two point inverting method driving, wherein FIG. 5*a* is the schematic diagram of an n-th frame and FIG. 5*b* is the schematic diagram of an (n+1)-th frame. In a first column as shown in FIG. 5*a*, a gate line G1 in a first row and a gate line G2 in a second row are positive polarity, a gate line G3 in a third row and a gate line G4 in a fourth row are negative polarity. When a gate of the gate line G1 in the first row turns on, data transit from a negative level to a positive level; when a gate of the gate line G2 in the second row turns on, data transit from a positive level to a positive level; when a gate of the gate line G3 in the third row turns on, data transit from a positive level to a negative level; and when a gate of the gate line G4 in the fourth row turns on, data transit from a negative level to a negative level. When the polarity changes (for example, from negative to positive or from positive to negative), a driving area becomes larger relatively, which renders a longer delay in an output waveform, and when the polarity does not change (for example, from negative to negative or from positive to positive), it renders a shorter delay in an output waveform. The delay in the output waveform results in a charging difference of a pixel electrode, for example, since the gate line G1 in the first row and the gate line G3 in the third row have a change in polarity, charging degree of the pixel electrodes are lower, and since the gate line G2 in the second row and the gate line G4 in the fourth row have no change in polarity, the charging degree of the pixel electrodes are higher, thus it makes that there is a difference in the charging degree of the pixels in two adjacent rows, that is the charging degrees are not consistent.

FIG. 6 is an output waveform diagram of a prior art driver IC, in which a solid line denotes the output waveform of the gate line in the first row and a broken line denotes the output waveform of the gate line in the second row. For the gate line in the first row, the output polarity of the driver IC changes, an increase in the driving area results in a more serious delay in the charging degree; and for the gate line in the second row, the output polarity of the driver IC does not change, a decrease in the driving area results in a less serious delay in the charging degree. It can be seen from a comparison in FIG. 6 that the delay in the output of the gate line in the first row is greater than that of the gate line in the second row. Such a difference in output slew rate of the driver IC results in the dim line phenomenon and reduces picture display quality.

SUMMARY OF THE INVENTION

An object of the present invention is to provide a driving method for a driver IC, wherein different driving modes are employed according to a condition that a polarity of the driver IC changes to overcome a dim line phenomenon effectively and to improve picture display quality of a liquid display apparatus.

To achieve above object, the present invention provides a driving method for a driver IC, comprising: detecting a polarity of a gate line being driven; when the polarity changes, the driver integrated circuit drives the gate line with a first mode signal; when the polarity does not change, the driver integrated circuit drives the gate line with a second mode signal, a driving current of the first mode signal is greater than that of the second mode signal.

The driving current of the first mode signal is 1.5-3.5 times of that of the second mode signal, preferably, the driving current of the first mode signal is 2.5 times of that of the second mode signal. Further, the first mode signal is a large power mode signal, and the second mode signal is a normal mode signal.

Based on the above solution, the detecting a polarity of a gate line being driven is in detail that: at a driving time of the driver integrated circuit, a timing controller determines whether the polarity of the gate line being driven changes.

Based on the above solution, the detecting a polarity of a gate line being driven is in detail that: at a driving time of the driver integrated circuit, the driver integrated circuit determines whether the polarity of the gate line being driven changes.

The present invention sets forth a driving method for a driver IC, wherein the driver IC drives a gate line in different driving modes according to a condition that a polarity of the droved gate line changes. In particular, at a driving time of the driver IC, when the polarity of the gate line being driven changes, the driver IC drives the gate line with a first mode signal; and when the polarity of the gate line being driven does not change, the driver IC drives the gate line with a second mode signal. Since a driving current of the first mode signal is greater than that of the second mode signal, the present invention is enabled to minimize a difference between charging delays of pixel electrodes on two adjacent gate lines when driving using a two point inverting method, improving a dim line phenomenon. The charging delay of the pixel electrode on the gate line when a polarity of a gate line changes is greater than that when the polarity does not change. Therefore, when the driver IC drives the gate line with the first mode signal with a greater driving current, it is advantageous to reduce the charging delay of pixel electrode on the gate line; and when the driver IC drives the gate line whose polarity does not change with the second mode signal with a smaller driving current, it is advantageous to increase the charging delay of pixel electrode on the gate line, thereby maximally reducing the difference between the charging delays of the pixel electrodes on two gate lines, minimizing a difference between the output waveforms of the pixel electrodes on the two gate lines and improving the dim line phenomenon. Meanwhile, compared with the prior art all driving by employing the large power mode signal, the present invention employs ½ driving area with the large power mode signal and ½ driving area with the normal mode signal, reducing the operation power. Further, in a case that an increase in a size of a panel results in an increase in a load of the panel, the dim line problem due to this can also be solved by the solution of the present invention.

A further detailed description will be made below to the technical solution of the present invention by the accompanying drawings and embodiments.

DETAILED DESCRIPTION OF THE PREFERRED EMBODIMENTS

Figure 1:
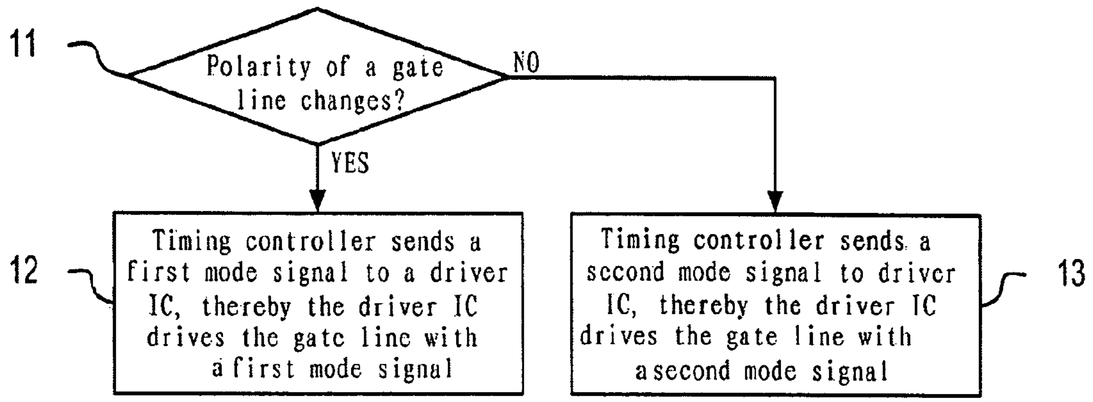
FIG. 1 is a flowchart of a first embodiment of a driving method for a driver IC of the present invention.

A driving method for a driver IC of the present invention comprises in detail: monitoring a polarity of a gate line being driven; when the polarity changes, the driver IC drives the gate line with a first mode signal; when the polarity does not change, the driver IC drives the gate line with a second mode signal, a driving current of the first mode signal is greater than that of the second mode signal.

The present invention breaks through a manner that a prior art driver IC uses a single driving mode to drive all gate lines, and sets forth a technical solution of using two driving mode to drive gate lines according to a condition that a polarity of the driven gate line changes. In particular, at a driving time of the driver IC, when a polarity of the driven gate line changes, the driver IC drives the gate line with a first mode signal, and when the polarity of the driven gate line does not change, the driver IC drives the gate line with a second mode signal. Since a driving current of the first mode signal is greater than that of the second mode signal, it enables the present invention to minimize a difference between charging delay of pixel electrodes on two adjacent gate lines when using a two point inverting method driving, and a dim line phenomenon is improved. When a polarity of a gate line changes, a charging delays of a pixel electrode on the gate line is greater than that on the gate line when the polarity dos not change, therefore, when the driver IC drives the gate line with the first mode signal having a greater driving current, it is advantageous to reduce the charging delay of the pixel electrode on the gate line; whereas, when the driver IC drives the gate line whose polarity does not change with the second mode signal having a smaller driving current, it is advantageous to increase the charging delay of the pixel electrode on the gate line, thereby maximally reducing a difference between the charging delays of the pixel electrodes on the two gate lines, minimizing a difference between the output waveforms of the pixel electrodes on the two gate lines and improving the dim line phenomenon.

In the above solution of the present invention, the driving current of the first mode signal may be 1.5-3.5 times of that of the second mode signal. Through adjustment of a driving current ratio of the two driving mode, the difference in the charging delays of the pixel electrodes on the two gate lines may be adjusted to minimize the difference between the output waveforms of the pixel electrodes on the two rows; preferably, the driving current of the first mode signal is 2.5 times of that of the second mode signal. Further, a large power mode signal (heavy mode) or a normal mode signal (normal mode) is set in the output of the existing driver IC. If a load of a panel is greater, the output of the driver IC is set to the large power mode signal; and if the load of the panel is smaller, the output of the driver IC is set to the normal mode signal. With the existing driving mode signals in the prior art, the first mode signal of the present invention can take the large power mode signal directly, and the second mode signal can take the normal mode signal directly, thereby simplifying a control manner and utilizing existing control resources fully.

Based on the above technical solution, the present invention driving gate lines in two driving modes can be implemented in many ways, and will be further described by detailed embodiments.

<First Embodiment>

FIG. 1 is a flowchart of a first embodiment of a driving method for a driver IC of the present invention, details are:

At step 11, at a driving time of the driver IC, a timing controller determines whether a polarity of a gate line being driven changes, if the polarity changes, then step 12 is performed, and if the polarity does not change, then step 13 is performed;

At step 12, the timing controller sends a first mode signal to the driver IC, thereby the driver IC drives the gate line with the first mode signal;

At step 13, the timing controller sends a second mode signal to the driver IC, thereby the driver IC drives the gate line with the second mode signal.

In this embodiment, the first mode signal and the second mode signal may be a high level and a low level respectively, and also may be a low level and a high level respectively, which are set according to an actual situation. The first mode signal can take a large power mode signal and the second mode signal can take a normal mode signal. The driver IC operates with the large power mode signal when a control pin is a high level, and operates with the normal mode signal when the control pin is a low level.

Figure 2:
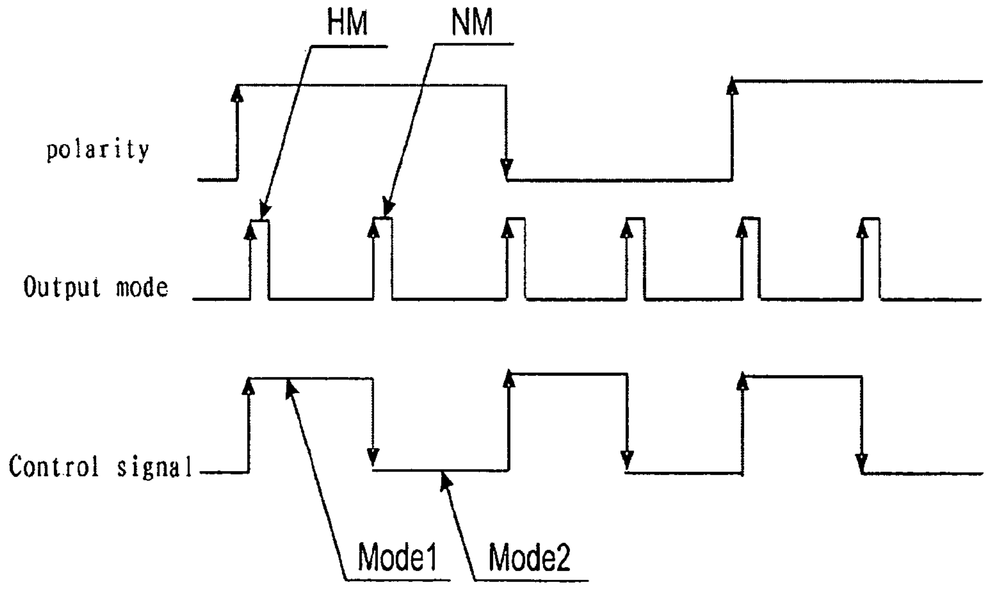
FIG. 2 is a timing diagram of the first embodiment of the present invention.

FIG. 2 is a timing diagram of the first embodiment of the present invention. Gate lines in a panel periodically change in polarity with a two point inverting method. Assumed that the polarity of a gate line in an n-th row changes (for example, from negative to positive or from positive to negative), the polarity of a gate line in an (n+1) row does not change (for example, from negative to negative or from positive to positive), output modes of the driver IC include a large power mode signal HM and a normal mode signal NM, control signals of the timing controller include the first mode signal Mode1 and the second mode signal Mode2. As shown in FIG. 2, at a time that the driver IC drives the gate line in the n-th row, the polarity of the gate line in the n-th row is changing; at this time, the timing controller generates a first mode signal (high level) and sends it to the driver IC, which drives the gate line in the n-th row with the large power mode signal HM according to the first mode signal. At a time that the driver IC drives the gate line in the (n+1)-th row, the polarity of the row gate in the (n+1)-th line does not change; at this time, the timing controller generates the second mode signal (low level) and sends it to the driver IC, which drives the gate line in the (n+1)-th row with the normal mode signal NM according to the second mode signal.

Since there is a difference between a output slew rate at the time that the polarity changes and the output slew rate at the time that the polarity does not change, charging delays of pixel electrodes on the gate line in the n-th row is greater than that of pixel electrodes on the gate line in the (n+1)-th row. Thus, when the driver IC drivers the gate line in the n-th row with the large power mode signal HM, it is advantageous to reduce the charging delay of the pixel electrode on the gate line in the n-th row, and when the driver IC drivers the gate line in the (n+1)-th row with the normal mode signal NM, it is advantageous to increase the charging delay of the pixel electrode on the gate line in the (n+1)-th row, thereby maximally reducing the difference between the charging delays of the pixel electrodes on the two gate lines, minimizing the difference between the output waveforms of the pixel electrodes on the two gate lines and improving the dim line phenomenon.

Compared with the prior art all driving by employing the large power mode signal, the present invention employs ½ driving area with the large power mode signal and ½ driving area with the normal mode signal, reducing the operation power.

Figure 3:
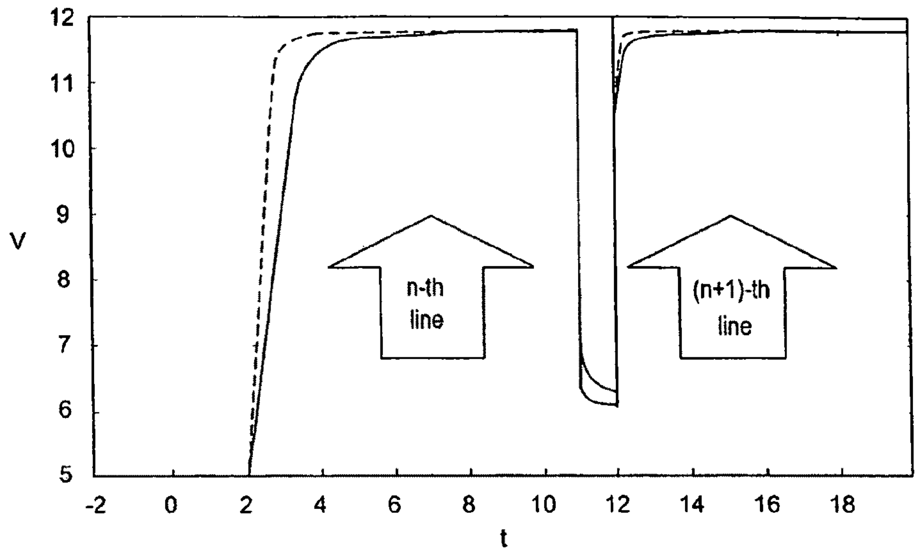
FIG. 3 is an output waveform diagram of the first embodiment of the present invention.

FIG. 3 is an output waveform diagram of the first embodiment of the present invention. As shown in FIG. 3, a broken line indicates the output waveform of the large power mode signal HM and a solid line indicates the output waveform of the normal mode signal NM. It can be seen that, even if both the gate line in the n-th row and the gate line in the (n+1)-th row are both driven with the large power mode signal, the difference between the charging delays of the pixel electrodes on the gate lines in the n-th row and in the (n+1)-th row is still great. The present invention makes the gate line in the n-th row to operate with the large power mode signal (the dash line for the gate line in the n-th row) and makes the gate line in the (n+1)-th row to operate with the normal mode signal (the solid line for the gate line in the (n+1)-th row), thereby minimizing the difference between the charging delays of the two gate lines, improving the dim line phenomenon and reducing the operation power. Also, the dim line problem due to an increase in a load of the panel resulted from an increase in a size of the panel can be solved by the solution of the present invention.

<Second Embodiment>

Figure 4:
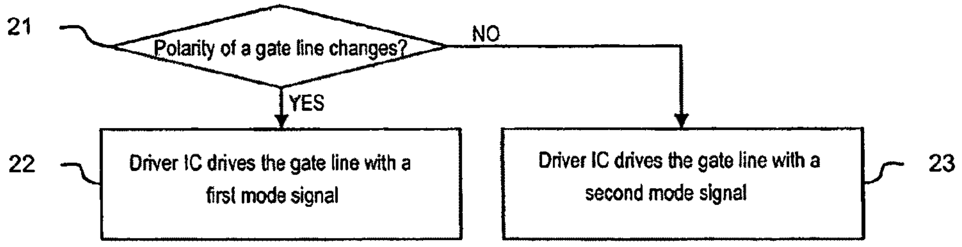
FIG. 4 is a flowchart of a second embodiment of a driving method for a driver IC of the present invention.
Figures 5A, 5B, 6:
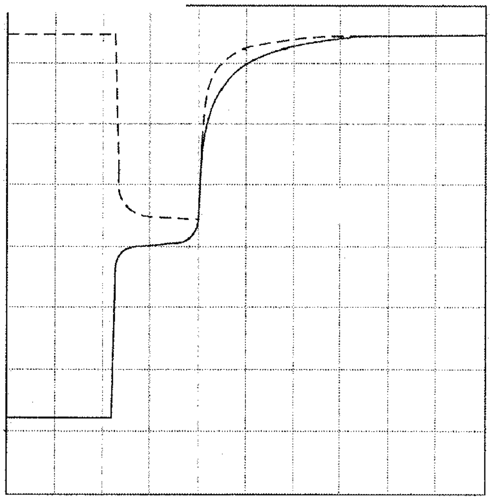
FIG. 5a (Prior Art)
FIG. 5b (Prior Art)
FIG. 6 (Prior Art)
FIG. 5*a*, FIG. 5*b* is a schematic diagram of a prior art two point inverting method driving.
FIG. 6 is an output waveform diagram of a prior art driver IC.

FIG. 4 is a flowchart of a second embodiment of the driving method for a driver IC of the present invention, details are:

At step 21, at a driving time of the driver IC, the driver IC determines whether a polarity of a gate line being driven changes, if the polarity changes, then step 21 is performed, and if the polarity does not change, then step 23 is performed;

At step 22, the driver IC drives the gate line with a first mode signal;

At step 23, the driver IC drives the gate line with a second mode signal.

Compared with the first embodiment shown in FIG. 1, an operation of determining whether the polarity of the gate line being driven changes is completed by the driver IC in the present embodiment. At the driving time the driver IC determines whether the polarity changes, if the polarity changes, then the gate line is driven with the first mode signal, and if the polarity does not change, then the gate line is driven with the second mode signal. Thus, a process of driving the gate line in two driving modes respectively is completed entirely within the driver IC, thereby a control flow is simplified, which facilitates design and implementation of a control system. In the present embodiment, the first mode signal can take a large power mode signal and the second mode signal can take a normal mode signal, with the same functions and effects as in the first embodiment, whose details are omitted herein.

It can be understood by those ordinary skilled in the art that all or part of the steps to achieve the above method embodiments can be implemented by hardware related to program instructions, and the foregoing program can be stored in a computer readable storage medium, and when the foregoing program is executed, the steps including the above methods embodiments will be performed; and the foregoing storage medium includes various media such as ROM, RAM, magnetic disk or optical disk etc. that can store program codes.

Finally, it should be noted that the above embodiments are only used to describe but not to limit the technical solution of the present invention. Although detailed descriptions have been made referring to the preferred embodiments, it should be understood by those ordinary skilled in the art that modifications and equivalent alternations can be made to the technical solution of the present invention without departing from the spirit and the scope of the technical solution of the present invention.

The invention claimed is:

1. A driving method for a driver integrated circuit, characterized in comprising: detecting a polarity of a gate line being driven; when the polarity changes, the driver integrated circuit drives the gate line with a first mode signal; when the polarity does not change, the driver integrated circuit drives the gate line with a second mode signal, a driving current of the first mode signal is greater than that of the second mode signal, wherein an amplitude of the driving current of the first mode signal is 1.5-3.5 times of that of the second mode signal.

2. The driving method for a driver integrated circuit of claim 1, characterized in that the amplitude of the driving current of the first mode signal is 2.5 times of that of the second mode signal.

3. The driving method for a driver integrated circuit of claim 1, characterized in that the first mode signal is a large power mode signal and the second mode signal is a normal mode signal.

4. The driving method for a driver integrated circuit of claim 1, characterized in that the detecting a polarity of a gate line being driven is in detail that: at a driving time of the driver integrated circuit, a timing controller determines whether the polarity of the gate line being driven changes.

5. The driving method for a driver integrated circuit of claim 1, characterized in that the detecting a polarity of a gate line being driven is in detail that: at a driving time of the driver integrated circuit, the driver integrated circuit determines whether the polarity of the gate line being driven changes.

6. A driving method for a driver integrated circuit, comprising:

detecting a polarity of a gate line being driven;

driving the gate line with a first mode signal when the polarity changes from a first polarity to a second polarity and when the polarity changes the second polarity to the first polarity; and driving the gate line with a second mode signal when the polarity does not change, wherein a driving current of the first mode signal is greater than that of the second mode signal, wherein an amplitude of the driving current of the first mode signal is 1.5-3.5 times of that of the second mode signal.

7. The driving method for a driver integrated circuit of claim 6, wherein the first polarity is a negative polarity and the second polarity is a positive polarity.

8. The driving method for a driver integrated circuit of claim 6, characterized in that the amplitude of the driving current of the first mode signal is 2.5 times of that of the second mode signal.

9. The driving method for a driver integrated circuit of claim 6, characterized in that the first mode signal is a large power mode signal and the second mode signal is a normal mode signal.

10. The driving method for a driver integrated circuit of claim 6, characterized in that the detecting a polarity of a gate line being driven is in detail that: at a driving time of the driver integrated circuit, a timing controller determines whether the polarity of the gate line being driven changes.

11. The driving method for a driver integrated circuit of claim 6, characterized in that the detecting a polarity of a gate line being driven is in detail that: at a driving time of the driver integrated circuit, the driver integrated circuit determines whether the polarity of the gate line being driven changes.

* * * * *